United States Patent

[11] 3,608,946

| [72] | Inventors | Edward D. Erickson<br>Arvada;<br>Robert L. Wilson, Boulder, both of Colo. |
|---|---|---|
| [21] | Appl. No. | 776,934 |
| [22] | Filed | Nov. 19, 1968 |
| [45] | Patented | Sept. 28, 1971 |
| [73] | Assignee | The Dow Chemical Company<br>Midland, Mich. |

[54] DEVICE FOR HANDLING OF A FILTER MEMBRANE
4 Claims, 3 Drawing Figs.

[52] U.S. Cl. .................................................... 294/64,
210/238, 210/345
[51] Int. Cl. ........................................................ B66c 1/02
[50] Field of Search............................................ 210/232,
234, 541, 542, 416, 406, 422, 474, 477; 221/211;
294/64, 65, 64 A, 64 B

[56] References Cited
UNITED STATES PATENTS

| 2,280,658 | 4/1942 | Miller............................ | 294/64 A |
| 2,956,769 | 10/1960 | Sigler et al. ................... | 294/64 X |

*Primary Examiner*—Samih N. Zaharna
*Attorneys*—Griswold and Burdick, V. Dean Clausen and William R. Norris ABSTRACT: A vacuum-operated tool useful for removing a filter medium, such as a filter membrane or disc, from its package and for subsequently seating the membrane on a horizontal plate filter. The tool eliminates direct manual handling of the membrane, thus preventing flexing of the membrane and possible cracking or tearing of the material as a result of the flexing.

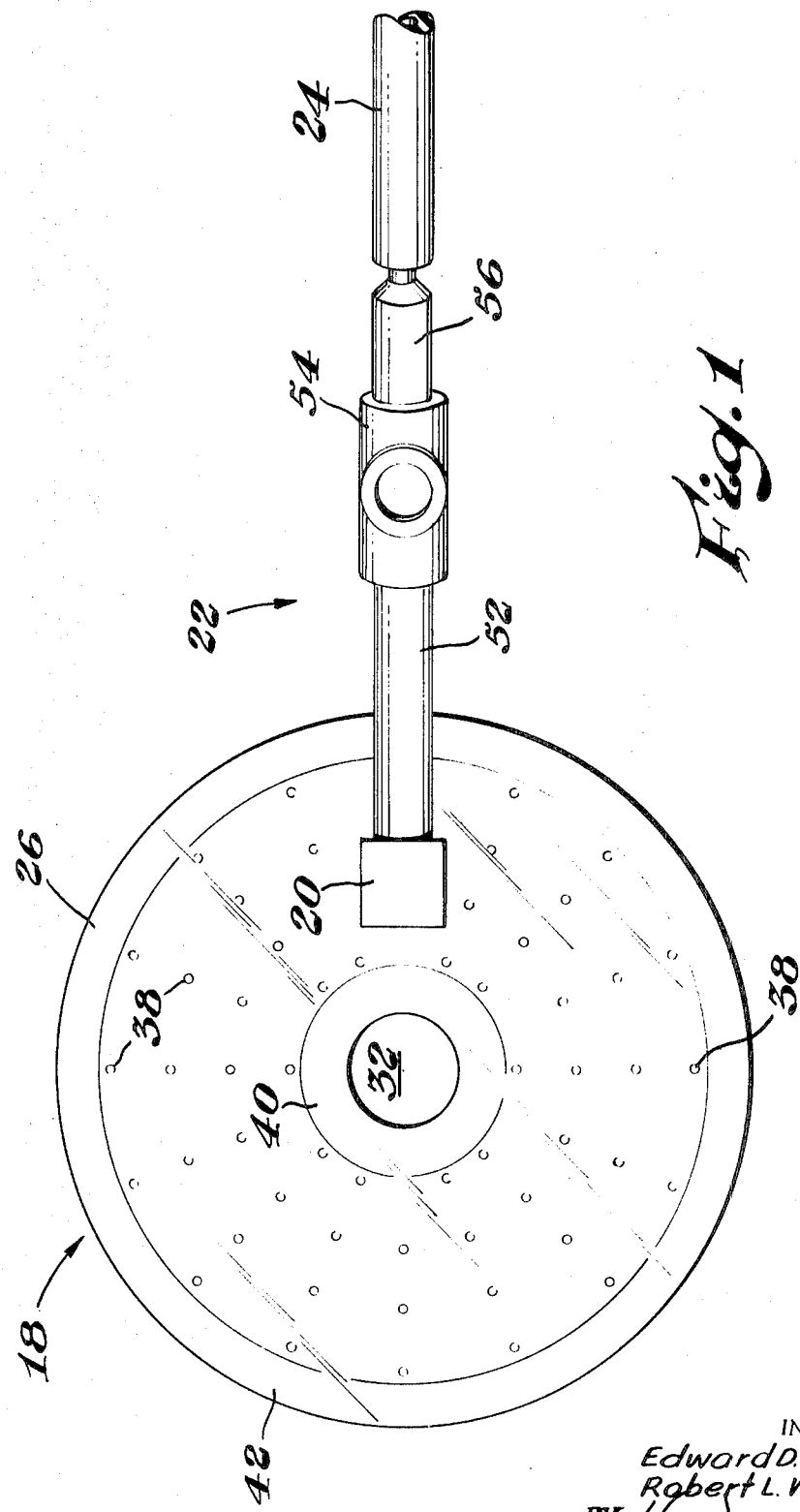

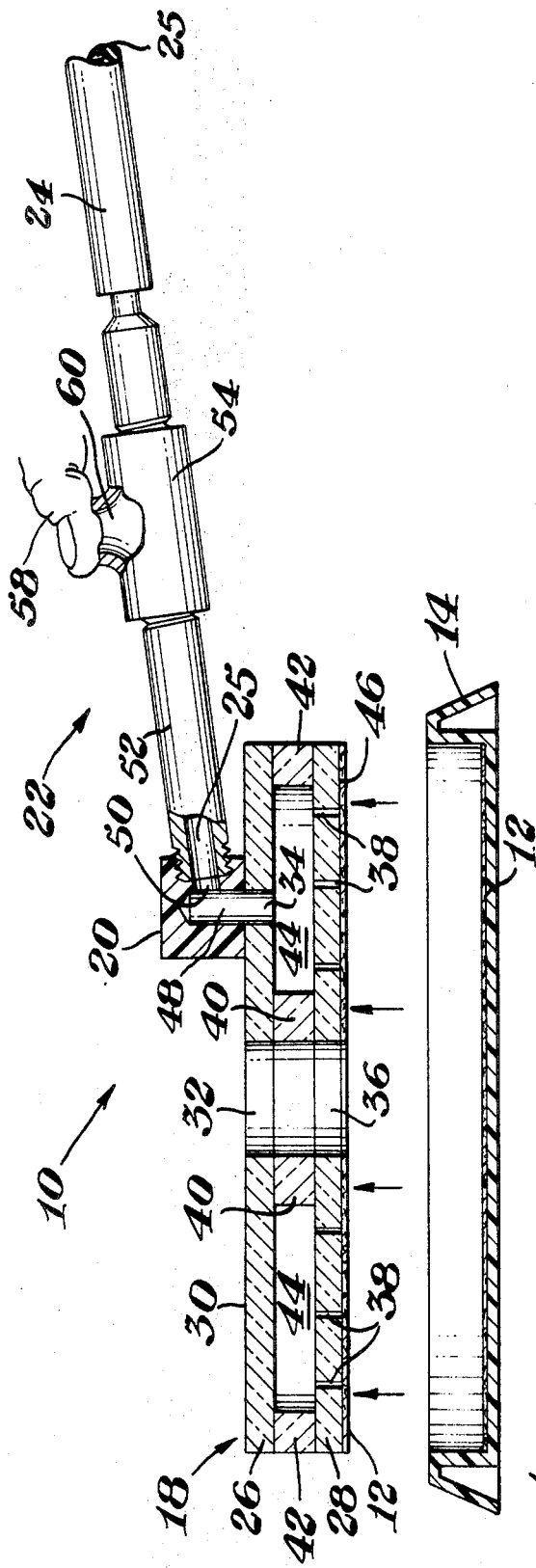
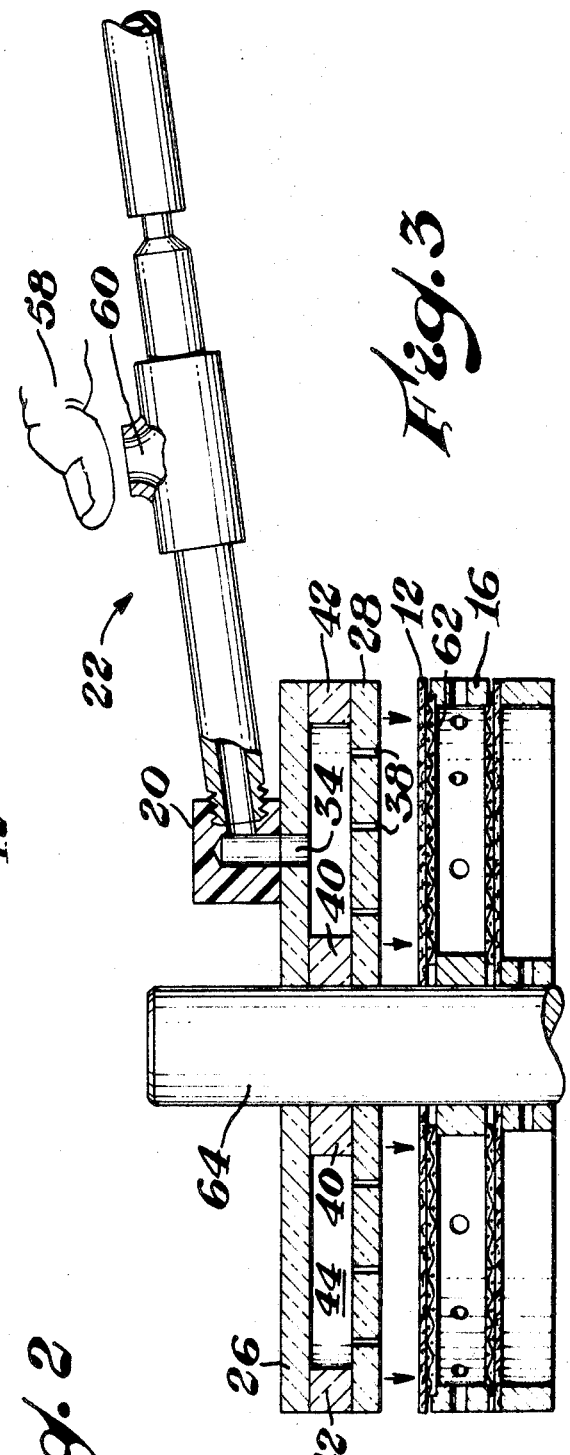
INVENTORS.
Edward D. Erickson
Robert L. Wilson
BY J. Dean Clausen
AGENT

DEVICE FOR HANDLING OF A FILTER MEMBRANE

BACKGROUND OF THE INVENTION

This invention relates to a device for handling a fragile filter medium, such as a filter membrane or disc. More particularly, the invention concerns a vacuum-operated tool which may be used to improve a filter membrane from its package and to seat the membrane on a filter plate.

The invention described herein was made in the course of, or under, a contract with THE UNITED STATES ATOMIC ENERGY COMMISSION.

Horizontal plate filters, such as "Millipore" (brand) multiplate and single-plate filters are widely used in industry and science today to filter various fluids to remove therefrom contaminating particulate matter in the micron and submicron size range. The filter membranes employed in the filter apparatus to screen out the solid materials are extremely thin sheet structures (approximately 150 microns) comprising materials such as polyvinyl chloride, nylon, cellulose esters, cellulose acetate, and the like. In manually transferring the membranes from the package in which they are stored to the plate holder of he filter apparatus, the thin sheets will quite naturally flex in the operator's hand and the resulting deformation will frequently produce "hairline" cracks in or tearing of the membrane.

This particularly undesirable where the solid matter being filtered is in the micron size range,, since some of the contaminating particulate matter will pass through the cracks or tears in the membrane along with the fluid being filtered. Additionally, direct manual positioning of the membrane on the filter apparatus is complicated by the fact that the membrane may "wrinkle" during such positioning and thereby prevent adequate sealing of the membrane between the plate holders in the filter plate stack with O-ring gaskets provided for this purpose. If the seal between the membrane and the plate holder is weak at any point the solids being filtered (particularly those materials having micron or submicron size particles) will bypass the membrane at such points.

OBJECTS OF THE INVENTION

Accordingly, a broad object of this invention is to provide a device for manipulating a filter membrane which eliminates direct manual handling of the membrane when positioning it in a filter apparatus.

A more specific object of the invention is to provide a simple and convenient vacuum-operated tool useful for removing a filter membrane from its package and for properly aligning and positioning the membrane on a plate holder in a horizontal multiplate filter.

Still another object of the invention is to provide a tool for eliminating direct manual handling of a filter membrane while positioning the membrane on a filter plate to reduce the possibility of contaminating the membrane. Such an advantage is of particular importance where the filtering operation must be conducted under sterile conditions.

SUMMARY OF THE INVENTION

These benefits and other advantages in accordance with the invention are achieved by providing a vacuum-operated tool which comprises, in combination, a vacuum box means and a handle means, a connector fitting mounted on the vacuum box which connects the vacuum box with a handle means. The handle means is adapted for connection to one end of a vacuum line (preferably a length of tubing), with the opposite end of the line being connected to a vacuum source. The vacuum box means comprises an upper plate and a lower plate, the plates being spaced apart to define a chamber therebetween. A central bore in the connector fitting registers on one end with an opening in the vacuum box and engages the handle means on its opposite end. The handle means comprises a combination of fittings which provide a conduit to establish communication between the connector fitting and the vacuum line. Openings through the lower plate provide means for establishing a "vacuum condition" on the lower surface of the vacuum box when a vacuum is drawn in the chamber between the plates, so that a filter membrane or disc may be picked up and retained by the lower plate of the box. A central opening in the vacuum box is of a diameter such that the vacuum box will slidably engage an alignment post in a multiplate filter apparatus to provide means for guiding the tool onto a plate holder to assure correct placement of the membrane in the filter apparatus.

BRIEF DESCRIPTION OF THE DRAWING

FIG. 1 is a plan view of a vacuum-operated tool according to a preferred embodiment of this invention.

FIG. 2 is a side elevation view, partly in section, illustrating the operation of the tool of this invention in removing a filter membrane from its package.

FIG. 3 is a side elevation view, partly in section, illustrating the operation of the tool of this invention in seating of a filter membrane on a plate holder of a conventional horizontal multiplate filter.

The drawing illustrates only one of numerous embodiments within the scope of this invention and the form shown is selected for convenient illustration and clear demonstration of the principles involved.

DESCRIPTION OF A PREFERRED EMBODIMENT

In one embodiment of the present invention, as depicted in FIGS. 1-3 of the drawing, there is illustrated a vacuum-operated tool 10 which may be used to remove a filter membrane 12 from a package 14 in which the membrane is stored and thereafter to seat the membrane 12 on a plate holder 16 of a conventional horizontal multiplate filter (not shown). The tool 10 comprises basically a vacuum box means 18 on which is carried a connector fitting 20, the fitting being adapted for connection to a handle means 22, the handle means, in turn, being adapted for connection to a vacuum line 24.

The vacuum box means 18 is an integral unit comprising an upper plate 26, a lower plate 28 and the connector fitting 20 affixed to the upper face 30 of plate 26. Upper plate 26 is a generally circular plate having a concentric circular opening 32 and an opening 34 (preferably circular) therein, the opening 34 being of smaller diameter and spaced from the opening 32. Lower plate 28 is a generally circular plate having a concentric circular opening 36 and a plurality of openings 38 (preferably circular) therein. The openings 38 surround the openings 36 and are of substantially smaller diameter. Plates 26 and 28 are held in spaced coplanar relation by a first spacer member 40, in the form of a flat ring, which is sealed between the plates adjacent the concentric openings 32 and 36 therein, and a second spacer member 42, also comprising a flat ring, which is sealed between the plates at the periphery thereof. The space between plates 26 and 28, as defined by the spacer members 40 and 42, provides a chamber 44 in which a vacuum may be drawn to hold the filter membrane 12 to the lower face 46 of plate 28, as explained in more detail hereinafter. The connector fitting 20 is preferably a block- or cube-shaped fitting which is sealingly affixed to the upper face 30 of plate 26 to provide a means for attaching handle means 22 to the vacuum box means 18. Fitting 20 has a generally central bore therein which includes a first vertically-disposed bore portion 48 and a second horizontally disposed bore portion 50. The bore portion 50 intersects the bore portion 48 on one end, while the opposite end engages the handle means 22. Fitting 20 is positioned on the vacuum box 18 such that the bore portion 48 is in registry with the opening 34 in plate 26. This arrangement provides for direct communication of the chamber 44 in plate 18 with the vacuum line 24 through the conduit portion 25 of handle means 22. As a convenience for the operator to visually observe the operation of tool 10 in removing a filter membrane from its package and thereafter seating the disc on a plate filter, the component parts of vacuum box 18 (i.e. plates 26 and 28, spacer members 40 and 42 and connector fitting 20) are preferably fabricated of a substantially transparent plastic material. An especially preferred material is a clear thermoplastic polymeric material such as that known commercially as "Plexiglas."

The handle means 22 is made up of a combination of conventional pipe fittings, namely an externally threaded nipple 52, an internally threaded T-fitting 54 and a reducer coupling 56, which has an external thread connection and a tube connection. As best indicated in FIGS. 2 and 3, one end of the nipple 52 threadedly engages the bore portion 50 of connector fitting 20, while the opposite end threadedly engages a first branch of the T-fitting 54. A second branch of the T-fitting 54 threadedly engages one end of reducer coupling 56 to complete the handle means 22. Although the preferred embodiment of the handle means 22, as illustrated herein, utilizes conventional iron pipe fittings, it will be apparent that other types of fittings, such as, for example, copper, brass, stainless steel or the like, may be combined to provide a similar construction. A length of tubing 24, connected on one end to the tube connection of reducer coupling 54 and on its opposite end to a vacuum source (not shown) provides a line through which a vacuum may be drawn in the chamber 44 of vacuum box 18. Any suitable tubing such as rubber or plastic, may be used for this purpose. A particularly preferred tubing is a vinyl tubing such as that known commercially as "Tygon."

OPERATION

In a typical operation of the present invention the tool 10 has been found to be particularly useful in handling of filter membranes such as those known commercially as "Millipore" (brand) filters. In one such example, as illustrated in FIG. 2, the tool 10 is employed in removing filter membranes one at a time from a package containing several of the membranes. To remove a membrane 12 from its package 14 the operator grasps the tool 10 by placing one hand around the handle 22 and lowering the tool to a point just above the topmost membrane. Once the tool 10 is in this position the entrapped air in chamber 44 is evacuated by pulling a vacuum on the vacuum line 24 and the operator places his thumb 58 over the open branch 60 of T-fitting 54 to retain the "vacuum condition" in the chamber 44. The resulting "vacuum condition" created in openings 38 of plate 28 will pull the membrane 12 up against the lower face 46 of plate 28, as indicated by the arrows in the drawing, (FIG. 2) where the membranes will cling so long as the vacuum condition is held in chamber 44.

As illustrated in FIG. 3, once the membrane 12 is retained by the tool 10 it can then be transferred from its package and seated on a plate holder 16 of a conventional horizontal multiplate filter (not shown), such as a "Millipore" (brand) multiplate filter. To assure proper placement of the filter membrane 12 on the support screen 62 of plate holder 16, the diameter of the concentric opening in vacuum box 18, as defined by openings 32 and 36 in plates 26, is slightly larger than the diameter of an alignment post 64, which is centrally positioned in the plate holder stack of the filter apparatus. The close-sliding fit of the tool 10 on post 64 serves as a guide in directing the filter membrane 12 onto the support screen 62. As indicated in the drawing (FIG. 3), tool 10 is lowered on post 64 to a point just above the plate holder 16, at which point the operator releases his thumb 58 from the open branch 60 of T-fitting 54, which destroys the vacuum in chamber 44 and allows the membrane 12 to settle onto the support screen 62.

For best results in avoiding flexing or wrinkling of the filter disc when it is removed from its package and positioned in the plate holder stack of the filter apparatus, the plates 26 and 28 of vacuum box 18 should be approximately the same diameter as the filter membrane on which the tool 10 is used.

What is claimed is:

1. A tool for removing a filter membrane from a package and aligning and positioning the membrane on a plate holder in a horizontal multiplate filter, the tool comprising:

a vacuum box defined by an upper circular plate having a central opening therein and a smaller opening therethrough, which is spaced from the central opening; a lower circular plate having a central opening therein and a plurality of smaller openings therethrough which surround the central opening; wherein the upper and lower plates are spaced apart to define a chamber between the plates, the said plates are approximately the same diameter as a filter membrane to be removed from a package and the diameter of the central openings in the said upper and lower plates is slightly larger than the diameter of the alignment post of said multiplate filter;

a connector fitting having a generally central bore therein, the bore including a first bore portion disposed generally vertically in the connector fitting and a second bore portion which intersects the first bore portion and is disposed generally horizontally in the connector fitting, wherein the connector fitting is positioned over the smaller opening in the upper plate such that the first bore portion is in registry with said opening;

a handle means defined by an externally threaded nipple, an internally threaded T-fitting and a reducer coupling having an external thread and a tube connection, wherein the nipple threadedly engages the second bore portion of the connector fitting and a first branch of the T-fitting and wherein the reducer coupling threadedly engages a second branch of the T-fitting.

2. The device of claim 1 wherein the handle means is adapted for connection to one end of a vacuum line.

3. The device of claim 1 wherein the upper plate and the lower plate of the vacuum box means are held in coplanar relationship by spacer members sealed between said plates.

4. The device of claim 3 wherein the spacer members are defined by at least two flat rings, a first ring being sealed between said upper and said lower plates at the periphery of the plates and a second ring being sealed between said upper and said lower plates adjacent the central opening of the plates.